(12) United States Patent
Baker (10) Patent No.: US 7,549,022 B2
(45) Date of Patent: Jun. 16, 2009

(54) AVOIDING CACHE LINE SHARING IN VIRTUAL MACHINES

(75) Inventor: Brandon S. Baker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 11/490,785

(22) Filed: Jul. 21, 2006

(65) Prior Publication Data

US 2008/0022048 A1    Jan. 24, 2008

(51) Int. Cl.
G06F 12/00    (2006.01)
G06F 13/00    (2006.01)
G06F 13/28    (2006.01)

(52) U.S. Cl. ............... 711/130; 711/118; 711/127; 711/129

(58) Field of Classification Search ............ 711/130
See application file for complete search history.

(56) References Cited

U.S. PATENT DOCUMENTS

| | | | | |
|---|---|---|---|---|
| 5,675,763 | A | 10/1997 | Mogul | 711/135 |
| 6,507,898 | B1 | 1/2003 | Gibson et al. | 711/168 |
| 6,901,493 | B1 * | 5/2005 | Maffezzoni | 711/162 |
| 6,944,719 | B2 | 9/2005 | Rowlands et al. | 711/141 |
| 7,376,821 | B2 * | 5/2008 | Stephan et al. | 713/1 |
| 7,506,198 | B2 * | 3/2009 | Shoham | 714/6 |
| 2005/0132364 | A1 * | 6/2005 | Tewari et al. | 718/1 |
| 2005/0235123 | A1 * | 10/2005 | Zimmer et al. | 711/170 |

FOREIGN PATENT DOCUMENTS

JP    15036169    1/2003

OTHER PUBLICATIONS

Page, Daniel. Partitioned Cache Architecture as a Side-Channel Defence Mechanism. 2005. pp. 1-14.*
Osvik, Dag. Cache Attacks and Countermeasures: the Case of AES. Aug. 14, 2005. pp. 1-25.*
Bernstein, D., "Cache-timing attacks on AES," 2005, 36 pages.
Bonneau, J. et al., "Cache Collision Timing Attacks Against AES," Jun. 21, 2006, 1-16.
Bonneau, J. et al., "Powerpoint: Cache-Collision Timing Attacks Against AES," Jun. 2006, 56 pages.
Osvik, D. et al., "Cache Attacks and Countermeasures: the Case of AES (Extended Version)," Oct. 2005, 1-25.
Osvik, D. et al., "Powerpoint: Full AES key extraction in 65 milliseconds using cache attacks," Weizmann Institute of Science, 2005, 14 pages.
Percival, C., "Cache Missing for Fun and Profit," 2005, 1-13.

* cited by examiner

*Primary Examiner*—Kevin L Ellis
*Assistant Examiner*—Ryan Bertram
(74) *Attorney, Agent, or Firm*—Woodcock Washburn LLP

(57) ABSTRACT

Avoiding cache-line sharing in virtual machines can be implemented in a system running a host and multiple guest operating systems. The host facilitates hardware access by a guest operating system and oversees memory access by the guest. Because cache lines are associated with memory pages that are spaced at regular intervals, the host can direct guest memory access to only select memory pages, and thereby restrict guest cache use to one or more cache lines. Other guests can be restricted to different cache lines by directing memory access to a separate set of memory pages.

19 Claims, 5 Drawing Sheets

Processor Cache Lines 150

*Fig. 1*

(Prior Art)

*Fig. 2*

Processor Cache Lines 350

System Physical Memory Pages 300

| 0K |
| 4K |
| 8K |
| 12K |
| 16K |
| 20K |
| 24K |
| 28K |
| 32K |
| 36K |
| 40K |
| 44K |
| 48K |
| 52K |
| 56K |
| 60K |

Partition A Memory 310

| 0K |
| 16K |
| 32K |
| 48K |

Partition B Memory 320

| 4K |
| 20K |
| 36K |
| 52K |

Partition C Memory 330

| 8K |
| 24K |
| 40K |
| 56K |

VMM Memory 340

| 12K |

*Fig. 3*

401
determine a plurality of memory pages that are associated with a cache line

402
remap a guest memory access

403
direct guest memory access the determined memory pages so all memory pages used by a guest are associated with the cache line

404
optional step: in select circumstances flush cache line/memory pages when performing a context switch

AVOIDING CACHE LINE SHARING IN VIRTUAL MACHINES

BACKGROUND

Recent articles such as Daniel Bernstein, *Cache-timing attacks on AES*, 2005, and Colin Percival, *Cache Missing for Fun and Profit*, 2005, and Dag Arne Osvik, Adi Shamir, Eran Tromer, *Cache Attacks and Countermeasures: the Case of AES*, 2005, and Joseph Bonneau, Ilya Mironov, *Cache-Collision Timing Attacks Against AES*, 2006, expose a potential security vulnerability that may affect systems running virtual machines. In short, in a scenario where multiple guest operating systems share a single or multiple processors which in turn share a memory bus, it may be possible for a malicious guest to discover the private key of one or more of the other guests.

This could be accomplished by 1. loading a cache with data, 2. causing the victim guest to run code that would populate memory in a certain way, and 3. subsequently attempting to retrieve the data loaded into the cache while measuring the time it takes to do so. By measuring the time it takes to retrieve data loaded into the cache, the malicious guest discovers whether such data is in fact still in the cache. If the data is not in the cache, it will take more time to retrieve. If the data is not in the cache, then it can be inferred that the victim guest used that cache location. By determining which cache locations were used by the victim guest, the malicious guest can learn something about the victim's operations, and potentially enough to compromise the security of the victim.

Existing recommended solutions to cache line cryptanalysis, as provided in the above cited references, suggest changing cryptographic algorithms to mask memory accesses. This has several limitations. First, it requires rewriting cryptographic algorithms which is a costly undertaking. Second, it assumes algorithms can be made analysis resistant. Third, rewriting algorithms could significantly impact their performance.

Other mitigations, such as isolating memory in an operating system to protect cryptographic processes, are potentially put at risk when run on a virtual machine. This is due to the fact that a virtualized guest operating system may not have control over how its memory has been allocated to it and how other memory has been allocated to other potentially hostile partitions.

Virtual machine technology is increasingly important in today's technological landscape. For instance, business models may emerge in which multiple guest operating systems are hosted by a commercial hosting service. Security threats cannot be tolerated in such a setting. The invention addresses the above described vulnerability, and also provides performance gains which may warrant use of the invention for non-security related purposes as well.

SUMMARY

In consideration of the above-identified shortcomings of the art, the present invention provides systems and methods for avoiding cache-line sharing in virtual machines. For example, in a system running a host and multiple guest operating systems, the host facilitates hardware access by a guest operating system. In particular, the host can oversee memory access by the guest operating system. Because cache lines are associated with memory pages that are spaced at regular intervals, the host can direct guest memory access to only select memory pages, and thereby restrict guest cache use to one or more cache lines. Other guests can be restricted to different cache lines by directing memory access to a separate set of memory pages. Other advantages and features of the invention are described below.

BRIEF DESCRIPTION OF THE DRAWINGS

The systems and methods for avoiding cache line sharing in virtual machines in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
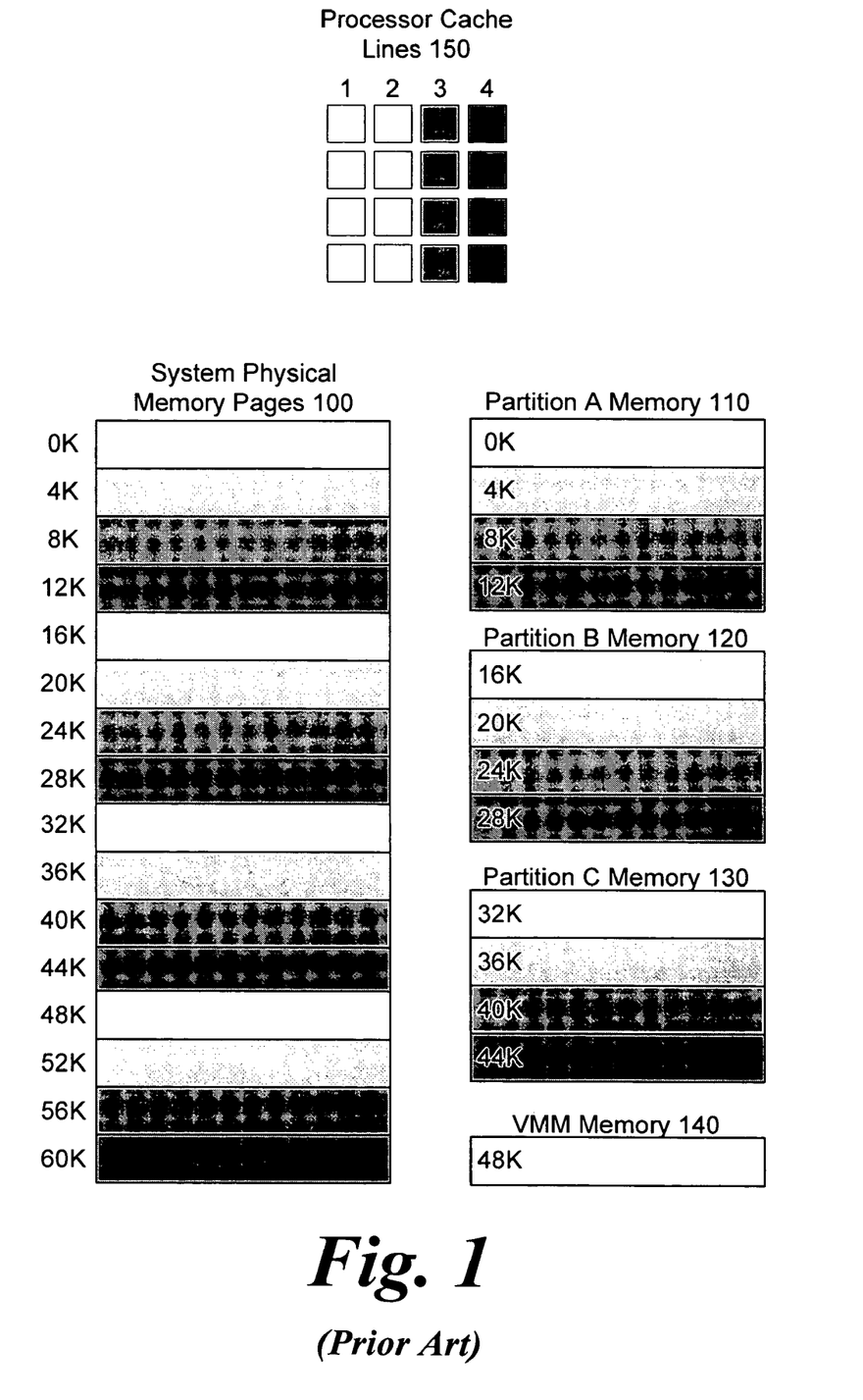
FIG. 1 illustrates a prior art approach to assigning memory to a plurality of guest partitions. A first guest might use, e.g., memory in partition A 110, which is a contiguous block of memory pages associated with cache lines 1, 2, 3 and 4. If a context switch is performed, another guest may use the same cache lines and memory pages.

FIG. 1 represents a simplified cache model. FIG. 1 contemplates an exemplary system that contains a processor with four cache lines 150 and sixteen pages of physical memory 100. There are three guest partitions 110, 120, 130, each with four pages of memory assigned to them. A host 140 has one page assigned to it.

FIG. 1 illustrates the traditional approach to cache-line allocation, which results in the security vulnerability discussed in the background section, as well as some negative performance implications. It will be appreciated that current computer processors, sometimes referred to as Central Processing Units (CPUs) contain internal memory caches to improve performance on data access and instruction fetch. These caches are often internally dedicated to specific sections of memory to limit their size and complexity in the processor die. This arrangement is often referred to as "associative": a given cache buffer can associate, or be used to cache, predefined memory addresses only. For example, if a CPU addresses memory in 4 kilobyte pages and that CPU contains four cache lines, then every 16th kilobyte of memory will associate to the same cache line. This means a read from memory address 0 K will fill in the first cache line. Any subsequent read from memory addresses 16K, 32K, 48K and so on may also fill in the first cache line, evicting the previous read, i.e. the read from address 0K in this example.

In FIG. 1, a hypothetical processor stores information in four cache lines 150, referred to as 1, 2, 3, and 4. Each cache line in this example has four "words" represented by the four boxes underneath each cache line identifier. Each cache line is associated with a plurality of memory pages in the system physical memory pages 100. For example, as might be deduced from the shading used in FIG. 1, the first word in cache line 1 refers to the 0K memory page in system physical memory pages 100. The second word in cache line 1 refers to the 16K memory page in system physical memory pages 100. The third word in cache line 1 refers to the 32K memory page in system physical memory pages 100. The fourth word in cache line 1 refers to the 48K memory page in system physical memory pages 100.

Similarly, the words in cache line 2 refer to the 4K, 20K, 36K, and 52K memory pages in system physical memory pages 100. The words in cache line 3 refer to the 8K, 24K, 40K, and 56K memory pages in system physical memory pages 100. The words in cache line 4 refer to the 12K, 28K, 44K, and 60K memory pages in system physical memory pages 100. This arrangement is a known and standard hardware implementation that will be appreciated by those of skill in the art.

It should be noted that cache lines 150 may be level one (L1) cache, level two (L2) cache, level three (L3) cache, or any further level of cache. While the invention is not limited to operations at any particular cache level, exemplary implementations discussed herein are directed to the L2 and/or L3 caches. This is because L2 and L3 caches are typically configured with the same n-way set associativity and line sizes, which are conducive to operation of embodiments of the invention.

Returning to FIG. 1, the right column illustrates the traditional approach for allocating cache lines to an application, including guest operating systems and/or associated emulation software. This approach involves allocating cache lines to maximize the utilization of consecutive memory pages by a particular application. Because a guest operating system's hardware resources are often referred to as a "partition," FIG. 1 illustrates memory allocation to three hypothetical guest partitions 110, 120, and 130, as well as a Virtual Machine Monitor (VMM) partition 140.

In general, virtual machine technology allocates hardware resources in a computer into partitions that are associated with guest operating systems. Some resources are dedicated to individual partitions. Others are shared; typically in a time-slice fashion. The choice of allocation of hardware resources is ultimately enforced by a host such as a VMM. The term "host" is used herein to refer generically to software that has primary access to, and control over the physical device hardware. A VMM is a host, as is a hypervisor, host operating system, etc. Main system memory is one hardware resource managed by the VMM. The choice of which memory pages to allocate to which partitions can be made by the VMM itself or a service partition delegated this task. In either case, it is the VMM that enforces this allocation.

As illustrated in FIG. 1, each guest may be allocated a partition comprising a consecutive set of memory pages. For example, Partition A Memory 110 comprises the 0K, 4K, 8K, and 12K memory pages. Partition B Memory 120 comprises the 16K, 20K, 24K, and 28K memory pages. Partition C Memory 130 comprises the 32K, 36K, 40K, and 44K memory pages. VMM Memory 140 comprises the 48K memory page. As can be deduced from the shading which associates memory pages and cache lines, as a result of the memory allocation, each guest operating system is using all four cache lines 1, 2, 3, and 4. The VMM is using only cache line 1, because it is using only a single memory page in this example. However, the cache line used by the VMM is nonetheless shared by the guest operating systems, exposing the VMM to the threat described in the background.

FIG. 1 thus demonstrates traditional, sequential assignment of system physical pages to partitions and the VMM itself. Using such a technique, memory access in Partition A can evict caches from Partitions B, C, and the VMM. If Partition B keeps cryptographic tables in memory, Partition A may be able to infer accesses. This exposes the security threat described in the background section, namely, that one partition could observe the memory access behavior of another partition or a host and infer information about its cryptographic processing, potentially revealing bits of a private key.

One additional result of cache line sharing as illustrated in FIG. 1 is that on a system with multiple execution contexts, the processor must tag cache entries to know which entries are valid for that context. When a processor determines whether a cache line is relevant to its current execution context it uses a tag for each cache entry with a reference for the page directory in which the cache line is relevant. If two execution contexts have colliding tags then a cache may appear to be valid for an execution context when it should not be.

One of the negative performance implications associated with the cache model of FIG. 1 is that a multi-processor system must provide a way to synchronize the caches of various processors. This is necessary for when one processor has read a memory location and cached its contents and another processor writes to that location, invalidating the contents of the first processor's cache.

Also, in FIG. 1 cache lines are effectively simultaneously shared between multiple partitions and a host because multiple processors could be executing in two or more partitions at the same time. Their memory reads or writes could invalidate each other's cache lines. As partitions can execute on multiple real CPUs simultaneously, they can continuously evict each other's caches. This can result in cache-thrashing, by which each partition must read in from main system memory due to cold caches, thus invalidating other partitions use of the same cache lines who then must also read in from main memory and evict the previous reader. This process, if left unchecked, can significantly affect system performance.

As may be appreciated from FIGS. 2 and 3, the invention provides a solution to the problems discussed with reference to FIG. 1 and in the background section, as well as a number of potential performance gains, by providing systems and methods in which the host 203 (VMM in FIG. 2), or a delegate authorized to specify memory allocation to partitions can examine the memory cache layout of system CPUs 210, 220 and allocate memory 230 to partitions to minimize or completely avoid cache line sharing by multiple guest operating systems 201, 202, and/or the host 203.

Figure 3:
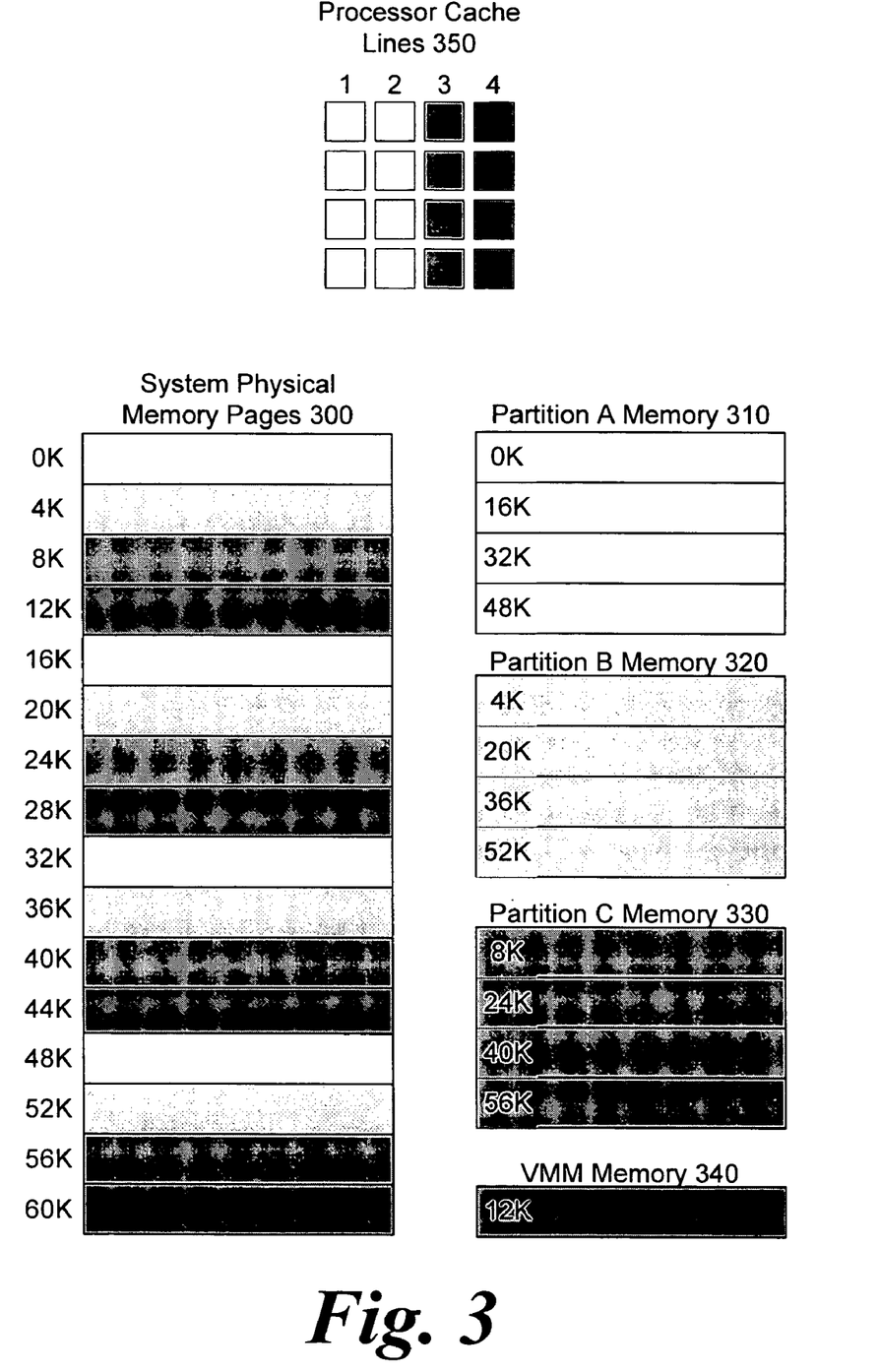
FIG. 3 illustrates assigning memory to guest partitions in accordance with an embodiment of the invention. A first guest can use partition A 310, which is a noncontiguous block of memory pages that are spaced at a regular interval so that they are associated with only cache line 1. If a context switch is performed, another guest can use memory pages associated with a different cache line such as cache line 2.

Referring briefly to FIG. 3, by strategically assigning memory to partitions to avoid cache line sharing, all of Partition A's memory accesses 310 fall within one cache line—here, cache line 1. Cache line 1 could be a single cache line or set of cache lines. As a result, Partition A reads and writes will not degrade cache performance of Partition B, C, or the VMM. Nor will Partition A be able to infer the memory access behavior of the other partitions or the VMM.

Figure 2:
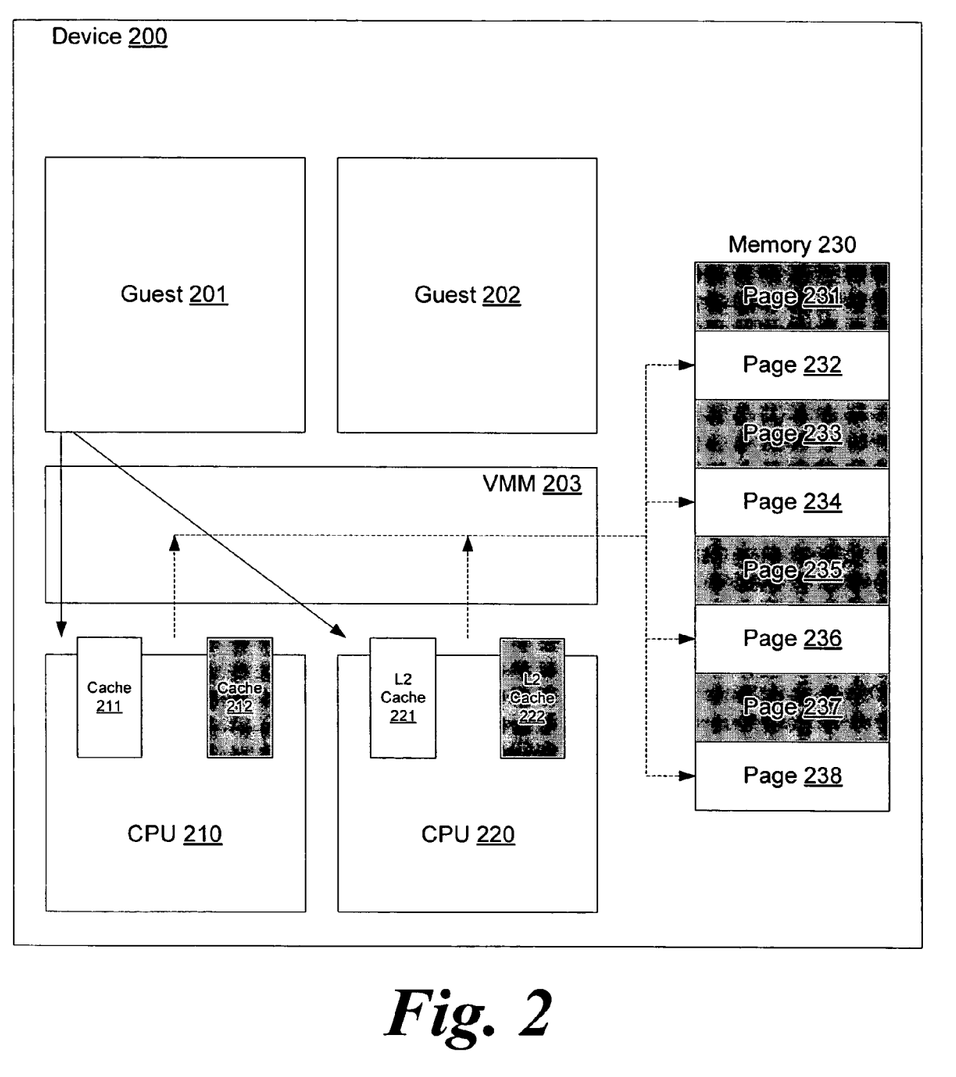
FIG. 2 illustrates a device 200 comprising processors 210, 220, cache lines 211, 212, 221, 222, a host 203, guests 201, 202, and memory 230. Guest memory accesses are directed to memory pages associated with some cache lines but not others. Other guests may use memory pages associated with different cache lines.

FIG. 2 provides a system for providing hardware access to a plurality of guest operating systems 201, 202, comprising a memory 230, a cache comprising at least two cache lines, e.g. 221, 222, wherein each cache line is associated with a plurality of memory pages that are spaced at a regular interval. In FIG. 2, cache line 221 is associated with memory page 232, 234, 236, and 238. Cache line 222 is associated with memory page 231, 233, 235, and 237. Thus, the regular interval for memory pages associated with cache line 221 is two, because every other cache memory page in memory 230 is associated with cache line 221. Similarly, cache line 222 is associated with a plurality of memory pages that are spaced at a regular interval of two, because every other cache memory page in memory 230 is associated with cache line 221. A "regular interval" is thus used herein to refer to an interval that is the same as a previous or subsequent interval.

FIG. 2 further comprises at least one guest 201, and a host 203 configured to assign memory pages used by said at least one guest 201 at said regular interval, so that all memory pages used by said at least one guest 201 are associated with a restricted subset of said at least two cache lines 221 or 222. For example, if the host 203 assigns memory pages from 230 used by guest 201 at a regular interval of two, then the guest will only read from or write to, for example, pages 232, 234, 236, and 238. As a result, all memory pages used by guest 201 would be associated with a restricted subset of cache lines 221 and 222—in this example, the restricted subset comprising only cache line 221. A "restricted subset" is used herein to refer to a subset that is less than the entire number of available cache lines.

Cache lines 221 and 222 are illustrated as being in a L2 cache, but as mentioned earlier the invention is not limited to any particular level of cache. A L3 cache is also considered particularly appropriate for certain embodiments of the invention.

In an embodiment in which cache lines 221 and 222 are associated with processor 220, a context switch can be performed to allow at least one second guest 202 to execute on said at least one processor 220. The host 203 can be configured to assign a separate set of memory pages, e.g. 231, 233, 235, and 237 for use by said second guest 202. This will similarly result in all memory pages used by said second guest 202 being associated with a restricted subset of said at least two cache lines 221 or 222. In this case, guest 202 is restricted to cache line 222, a different cache line than is being used by guest 201. Any number of guests may be hosted on device 200, and host 203 may be configured to assign a separate set of memory pages for use by each guest.

A performance benefit of assigning memory such that guest 202 uses a different cache line 222 than that of guest 201 is that guest 202 will not overwrite information cached by 201, and similarly will not overwrite information placed in memory by 201. Context switching can be done faster and with fewer cache misses. A security benefit is that the vulnerability discussed in the background section is resolved.

In one configuration, device 200 may further comprise a plurality of processors, e.g. processor 210 in addition to processor 220. As illustrated, cache lines 211, 212 associated with processor 210 may similarly be associated with a plurality of memory pages that are spaced at a regular interval. For example, just as before, cache line 211 may be associated with memory pages 231, 233, 235, and 237 while cache line 212 may be associated with memory pages 232, 234, 236, and 238.

Such a multi-processor embodiment allows a guest 201 to be transferred from a first processor 220 to a second processor 210. When this is done, host 203 can ensure that guest 201 uses the same general set of memory pages, e.g. 232, 234, 236, and 238, as it did when assigned to processor 220. Thus, in a multiprocessor system, a guest such as 221 can effectively have a reserved cache line and corresponding set of memory pages no matter which processor it is transferred to. This results in performance gains in reduced cache misses and reduced memory misses. Security vulnerability is also reduced.

It should be emphasized that just as the various guests 210, 202 can be assigned memory from 230 so as to limit them to a restricted subset of cache lines, the host 203 may similarly assign its own memory use. Thus, the performance and security gains can also be realized in context switches involving the host. The host 203 may thus be configured to assign memory pages from 230 used by said host 203 at an appropriate regular interval, so that all memory pages used by the host 203 are associated with at least one of said at least two cache lines, e.g. 221 or 222.

In another potential embodiment, a related plurality of guests may be assigned memory so as to share cache lines among the related plurality of guests but not with any guests outside such related plurality. For example, consider a hosting service for guests owned by a number of banks. A first bank may not care if its operating systems share cache lines with each other, but may not want to share cache lines with a competing bank. In such a situation, a separate set of memory pages for use by each related guest is associated with at least one of a reserved plurality of cache lines. For example, consider a scenario in which guests 201 and 202 are owned in common. Also, imagine that a number of additional cache lines are available which are not shown in FIG. 2, and which refer to some hypothetical memory pages that are also not shown. Guests 201 and 202 may be assigned to use any of memory pages 231-238, and thereby share cache lines 211, 212, 221, and 222 as they are context switched from processor 210 to 220 and vice versa as necessary. They may also be assured that no unaffiliated guests will intrude on their cache lines or memory pages.

FIG. 3 is designed to provide a clear juxtaposition between the cache model of the invention and the traditional cache model illustrated in FIG. 1. As stated above, memory from 300 may be strategically assigned to guests/partitions to avoid cache line sharing. Thus, a first guest is assigned to use memory pages at 0K, 16K, 32K and 48K. As a result, the first guest is restricted to a restricted subset of cache lines in 350, here, a subset consisting of cache line 1. Similarly, a second guest can be restricted to pages 4K, 20K, 36K and 52K, a third guest can be restricted to pages 8K, 24K, 40K, and 56K, and a host can be assigned pages associated with a fourth cache line, here, 12K and/or 28K, 44K, and 60K.

Figure 4:
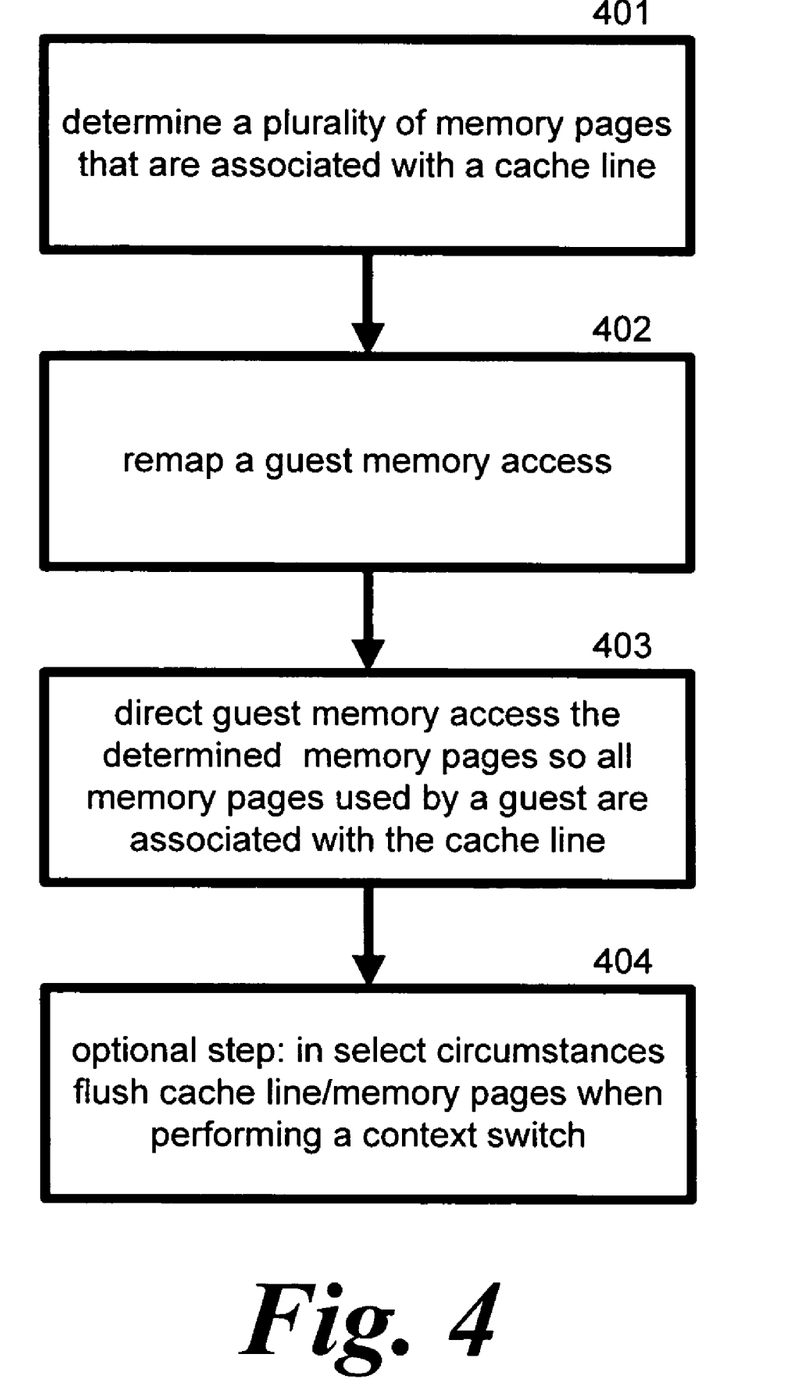
FIG. 4 illustrates a method for managing memory access by a guest.

FIG. 4 illustrates a method for managing memory access by a first guest, comprising determining a plurality of memory pages that are associated with a cache line 401, remapping a guest memory access 402, and directing said guest memory access to at least one of said plurality of memory pages, so that all memory pages used by said first guest are associated with said cache line 403. An optional step is also illustrated, comprising flushing a cache line and/or memory pages when performing a context switch 404.

In one embodiment, all the steps of FIG. 4 may be performed by a host. When starting or transferring a guest to run on a processor, the host may determine the memory pages to be used by the guest. If the guest is being started for the first time, the host may select any pages associated with a single cache line, or with a restricted subset of cache lines. Alternatively, the host may select memory pages according to the group of cache lines/memory pages in use by one or more related guests. If the guest was previously started and is simply being context-switched to a processor, then the host may refer to stored information regarding the restricted subset of memory pages/cache lines that the guest was using previously, and continue using such restricted subset.

While the guest is executing, the host or a memory subsystem under host control can remap guest memory access 402, and redirect it to the determined plurality of memory pages. Thus, the guest may never know that its memory access is being redirected. The host may be configured to present an artificial view of memory to the guest, so that the guest only sees a portion of memory associated with its assigned subset of cache lines.

The optional step 404 of flushing cache lines or memory pages may be performed, for example, when a host is forced to allow cache line sharing by multiple unrelated guests. Flushing refers to evicting and/or overwriting all the information in a memory location such as the cache or associated memory pages.

Figure 5:
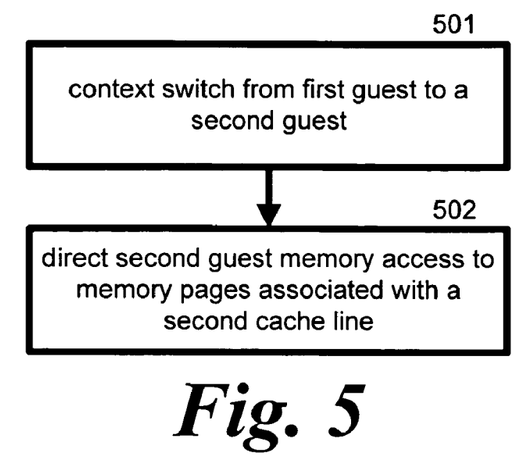
FIG. 5 illustrates a method for context switching from a first guest to a second guest.
Figure 6:
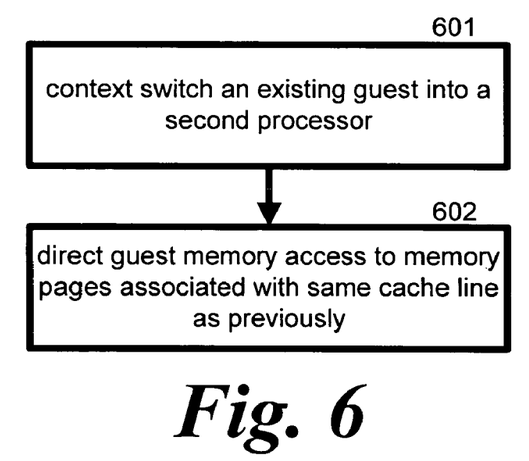
FIG. 6 illustrates a method for transferring a guest from a first processor to a second processor.
Figure 7:
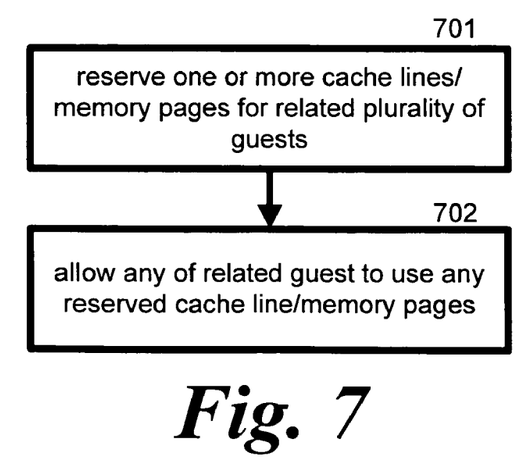
FIG. 7 illustrates a method for reserving cache lines and/or memory addresses for a related group of guests, e.g., a group of guests that are owned by a common entity.

The method illustrated in FIG. 4 may be augmented by method steps illustrated in FIGS. 5, 6, and 7. For example, referring to FIG. 5, a first context switch may be performed from a first guest to a second guest 501. The second guest's memory access may then be directed to memory pages associated with a second cache line 502, e.g. by essentially repeating the steps of FIG. 4 for the second guest: determining a second plurality of memory pages that are associated with a second cache line, remapping a second guest memory access, and directing said second guest memory access to at least one of said second plurality of memory pages, so that all memory pages used by said second guest are associated with said second cache line.

In another embodiment, as illustrated in FIG. 6, the first (existing) guest is transferred to a different processor. An existing guest refers to a guest that is currently live and running. Such a guest may be context switched to a second processor 601, and guest memory access may be directed to pages associated with a same cache line as previously 602.

FIG. 4 may also be augmented by steps illustrated in FIG. 7, such as reserving a plurality of memory pages for a related plurality of guests 701, for example, a plurality of guests that are owned by a same entity, and allowing any of the related guests to use any reserved cache lines or memory pages 702. Here, "reserved" should be understood to imply that the such memory pages and cache lines cannot be used by any unrelated guests while such memory pages or cache lines remain reserved. Depending on the embodiment, however, the host may or may not be allowed to use reserved memory pages and cache lines.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A system for providing hardware access to a plurality of guest operating systems, comprising:
   a memory;
   a cache comprising at least two cache lines, wherein each cache line is associated with a plurality of memory pages that are spaced at a noncontiguous, regular interval;
   at least one guest;
   a host configured to assign a plurality of memory pages used by said plurality of guest operating systems; wherein said memory pages of said plurality of guest operating systems are spaced at said noncontiguous, regular interval, so that all memory pages used by one of said plurality of guest operating systems are associated with a first restricted subset of said at least two cache lines; and
   at least one processor, wherein a context switch can be performed to allow at least one second guest to execute on said at least one processor, and wherein said host is configured to assign a cache line other than the restricted subset of cache lines to said second guest associated with a separate set of memory pages spaced at said noncontiguous, regular interval for use by said second guest.

2. The system of claim 1, wherein said cache is a level two cache.

3. The system of claim 1, further comprising a plurality of processors, wherein said at least one guest can be transferred from a first processor to a second processor.

4. The system of claim 1, wherein said at least one guest comprises a plurality of guests, and said is host configured to assign a separate set of memory pages for use by each guest.

5. The system of claim 4, wherein said a plurality of guests are a related plurality of guests, and said separate set of memory pages for use by each related guest is associated with at least one of a reserved plurality of cache lines.

6. The system of claim 1, wherein said host is further configured to assign memory
   pages used by said host at said regular interval, so that all memory pages used by said host are associated with a restricted subset of said at least two cache lines.

7. A method for managing memory access by a at least two guest operating systems, comprising:
   determining a plurality of noncontiguous, regularly spaced memory pages that are associated with a each of at least two restricted subsets of cache lines;
   mapping said at least two guest operating systems memory access;
   directing said at least two guest operating systems memory access such that each guest is assigned to a different subset of said plurality of memory pages, so that all memory pages used by said each of said at least two guest operating systems are associated with different ones of said at least two restricted subset of cache lines.

8. The method of claim 7, further comprising performing a first context switch from said first guest to a second guest.

9. The method of claim 8, further comprising:
   determining a second plurality of memory pages that are associated with a second restricted subset of cache lines;
   remapping a second guest memory access;
   directing said second guest memory access to at least one of said second plurality of memory pages, so that all memory pages used by said second guest are associated with said second restricted subset of cache lines.

10. The method of claim 8, further comprising performing a second context switch on a different processor than the first context switch, whereby said first guest is transferred to said different processor.

11. The method of claim 10, further comprising directing said guest memory access to a same plurality of memory addresses, so that all memory pages used by said first guest remain associated with said restricted subset of cache lines.

12. The method of claim 7, wherein said restricted subset of cache lines is in a level two cache.

13. The method of claim 7, further comprising reserving a plurality of memory pages for a related plurality of guests.

14. The method of claim 13, wherein said related plurality of guests are related by virtue of being owned by a same entity.

15. The method of claim 13, wherein said plurality of memory pages for a related plurality of guests are associated with a plurality of cache lines.

16. The method of claim 15, wherein memory pages associated with any of said plurality of cache lines may be used by any of said related plurality of guests.

17. The method of claim 7, further comprising flushing said restricted subset of cache lines prior to performing a context switch.

18. The method of claim 7, further comprising flushing said plurality of memory pages prior to performing a context switch.

19. A system for providing hardware access to a plurality of guest operating systems, comprising:
   a plurality of processors;
   a level two cache comprising a plurality of cache lines, wherein each cache line is associated with a plurality of memory pages that are spaced at a noncontiguous, regular interval;
   a memory;
   a plurality of guest operating systems;
   a host configured to assign a plurality of memory pages used by said plurality of guest operating systems at said noncontiguous, regular interval, so that all memory pages used by each of said plurality of guest operating systems are restricted to cache lines that are not used by any other of said plurality of guest operating systems.

* * * * *